United States Patent
Park et al.

(10) Patent No.: US 10,270,545 B2
(45) Date of Patent: Apr. 23, 2019

(54) METHOD AND DEVICE FOR DETECTING INTERFERENCE SIGNAL FROM LOW-POWER ENVELOPE DETECTION RECEIVER

(71) Applicant: SAMSUNG ELECTRONICS CO., LTD., Suwon-si (KR)

(72) Inventors: Chang Soon Park, Suwon-si (KR); Hyo Sun Hwang, Suwon-si (KR); Joon Seong Kang, Suwon-si (KR); Young Jun Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/194,149

(22) Filed: Jun. 27, 2016

(65) Prior Publication Data

US 2016/0308627 A1 Oct. 20, 2016

Related U.S. Application Data

(63) Continuation of application No. PCT/KR2014/004097, filed on May 8, 2014.

(30) Foreign Application Priority Data

Jan. 6, 2014 (KR) .................. 10-2014-0001378

(51) Int. Cl.
*H04B 17/345* (2015.01)
*H04B 1/10* (2006.01)
(Continued)

(52) U.S. Cl.
CPC ......... *H04B 17/345* (2015.01); *H04B 1/1027* (2013.01); *H04B 13/005* (2013.01); *H04L 25/03006* (2013.01)

(58) Field of Classification Search
CPC .. H04B 17/345; H04B 1/1027; H04B 13/005; H04L 25/03006
(Continued)

(56) References Cited

U.S. PATENT DOCUMENTS

| | | | |
|---|---|---|---|
| 5,581,495 A | | 12/1996 | Adkins et al. |
| 5,867,766 A | * | 2/1999 | Dinc ............ H04W 36/06 455/214 |

(Continued)

FOREIGN PATENT DOCUMENTS

| | | |
|---|---|---|
| JP | 6-93662 B2 | 11/1994 |
| JP | 4656237 B2 | 3/2011 |

(Continued)

OTHER PUBLICATIONS

Choi, Pilsoon, et al. "An Experimental Coin-Sized Radio for Extremely Low-Power WPAN (IEEE 802.15. 4) Application at 2.4 GHz." *IEEE Journal of Solid-State Circuits* 38.12 (2003): 2258-2268. (11 pages, in English).

(Continued)

*Primary Examiner* — Wednel Cadeau
(74) *Attorney, Agent, or Firm* — NSIP Law

(57) ABSTRACT

A device for detecting an interference signal includes an estimator configured to estimate a mean value of received signals output from an analog-digital converter (ADC), a filter configured to filter a low frequency band of the received signals using the estimated mean value to produce filtered received signals, a detector configured to detect, from the filtered received signals, interference signals using a coherent modulation scheme and a non-coherent modulation scheme, and a combiner configured to determine whether interference exists in a frequency channel in response to a result of the interference signal detecting using (Continued)

the coherent modulation scheme and the non-coherent modulation scheme, based on a preset condition.

22 Claims, 14 Drawing Sheets

(51) Int. Cl.
*H04L 25/03* (2006.01)
*H04B 13/00* (2006.01)

(58) Field of Classification Search
USPC .............. 375/147, 340, 173; 455/426.1, 62
See application file for complete search history.

(56) References Cited

U.S. PATENT DOCUMENTS

| | | | | |
|---|---|---|---|---|
| 6,070,086 | A * | 5/2000 | Dobrica | H04B 7/0857 370/342 |
| 6,249,696 | B1 * | 6/2001 | Olson | A61B 5/0428 128/901 |
| 8,379,692 | B2 * | 2/2013 | Wang | H04B 1/7115 329/327 |
| 2009/0161024 | A1 | 6/2009 | Gao et al. | |
| 2013/0039211 | A1 | 2/2013 | Hassan et al. | |
| 2013/0143501 | A1 | 6/2013 | Huang et al. | |
| 2013/0294539 | A1 * | 11/2013 | Howard | H04L 1/0003 375/273 |

FOREIGN PATENT DOCUMENTS

| | | |
|---|---|---|
| JP | 2012-205113 A | 10/2012 |
| KR | 10-0538775 B1 | 12/2005 |
| KR | 10-2007-0091547 A | 9/2007 |
| KR | 10-2008-0081261 A | 9/2008 |
| KR | 10-1249016 B1 | 4/2013 |
| KR | 10-2013-0110269 A | 10/2013 |
| WO | WO 2010/011091 A2 | 1/2010 |

OTHER PUBLICATIONS

Moncunill-Geniz, F. Xavier, et al. "A Generic Approach to the Theory of Superregenerative Reception." *IEEE Transactions on Circuits and Systems I: regular papers* 52.1 (2005): 54-70. (17 pages, in English).

International Search Report dated Oct. 6, 2014 in counterpart International Application No. PCT/KR2014/004097 (4 pages, with English translation).

* cited by examiner

METHOD AND DEVICE FOR DETECTING INTERFERENCE SIGNAL FROM LOW-POWER ENVELOPE DETECTION RECEIVER

CROSS-REFERENCE TO RELATED APPLICATIONS

This application is a continuation of International Application No. PCT/KR2014/004097 filed on May 8, 2014, which claims the benefit of Korean Patent Application No. 10-2014-0001378 filed on Jan. 6, 2014, in the Korean Intellectual Property Office, the entire disclosures of which are incorporated herein by reference for all purposes.

BACKGROUND

1. Field

The following description relates to a method for detecting an interference signal from a low-power envelope detection receiver. The following description also relates to a device for detecting an interference signal from a low-power envelope detection receiver.

2. Description of Related Art

A sensor network has been a widely used technology, starting from when wireless network technology became highly developed and commercialized. Technology for such a sensor network has been standardized, such as in Bluetooth, Institute of Electrical and Electronics Engineers (IEEE) standard 802.15.4, and the ZigBee Alliance ZigBee standard have been standardized for use with sensor network technologies based on IEEE standards.

Since sizes of sensors are small in various wireless sensor networks and local area networks, a large number of sensors may be implemented with a low complexity and low power requirements to increase an amount of operating time and improve their operation. In a wireless body area network (WBAN), in which a mobile device attached to a human body wirelessly communicates with a sensor attached to another human body, the low complexity and the low power may be more strictly required, due to aspects of operating in such conditions. To achieve such objectives as low complexity and low power, an ultra low-power radio frequency (RF) structure may be used instead of a high power RF structure.

In an ultra low-power transceiver, the reliability of communication between a transmitter and a receiver may be influenced by an outside interference signal due to a low power of a transmission signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a device for detecting an interference signal includes an estimator configured to estimate a mean value of received signals output from an analog-digital converter (ADC), a filter configured to filter a low frequency band of the received signals using the estimated mean value to produce filtered received signals, a detector configured to detect, from the filtered received signals, interference signals using a coherent modulation scheme and a non-coherent modulation scheme, and a combiner configured to determine whether interference exists in a frequency channel in response to a result of the interference signal detecting using the coherent modulation scheme and the non-coherent modulation scheme, based on a preset condition.

The filter may include a signed low pass filter (LPF) having a positive signal component and a negative signal component as an output, and an unsigned LPF having the positive signal component as the output, and the filter may be configured to filter the low frequency band of the received signals selectively or simultaneously using the signed LPF and the unsigned LPF.

The detector may include a first detector configured to detect a first interference signal using the coherent modulation scheme, and a second detector configured to detect a second interference signal using the non-coherent modulation scheme.

The detector may be configured to detect the interference signals selectively or simultaneously using the first detector and the second detector.

The first detector may be configured to detect the first interference signal based on characteristics of signal waveforms occurring at a start point and an end point of a predetermined detection window of the received signals.

The first detector may include a detection parameter adjuster configured to adjust a detection parameter used for detecting the first interference signal, a start signal detector configured to detect the characteristic of the signal waveform at the start point of the predetermined detection window based on the detection parameter, an end signal detector configured to detect the characteristic of the signal waveform at the end point of the predetermined detection window based on the detection parameter, and a first determiner configured to determine whether the first interference signal exists based on the characteristic of the signal waveform occurring at the start point and the characteristic of the signal waveform occurring at the end point.

The detection parameter may include at least one of a threshold of an output magnitude of an LPF, a slope indicating a predetermined slope value on a time axis of an output of the LPF, or a time range.

When the preset condition is a first condition based on a result obtained by performing an AND operation with respect to a detection result of the first detector and a detection result of the second detector, the combiner may be configured to determine that the interference signals exist in response to the interference signals being detected by the first detector and the second detector.

When the preset condition is a second condition, based on a result obtained by performing an OR operation with respect to a detection result of the first detector and a detection result of the second detector, the combiner may be configured to determine that the interference signals exist in response to the interference signals being detected by at least one of the first detector or the second detector.

When the preset condition is a third condition, based on a detection result of at least one of the first detector or the second detector chosen based on a statistical distribution characteristic of the received signals, the combiner may be configured to determine that the interference signals exist based on the detection result of at least one of the first detector or the second detector.

The combiner may further include a duty cycle estimator configured to estimate the statistical distribution characteristic of the received signals, and a selector configured to determine that the interference signals exist by switching to select the output of the first detector or the output of the second detector based on a result of the estimating.

The second detector may include a detection parameter setter configured to set a detection parameter for detecting the second interference signal from a predetermined detection window of the received signals, and a second determiner configured to determine whether the second interference signal exists based on the detection parameter.

The detection parameter may include at least one of a threshold of an output magnitude of an LPF or a time margin.

The device may further include a channel switch configured to switch an operation frequency channel from the frequency channel to another frequency channel based on whether the interference is determined to exist.

The channel switch may be configured to adjust a frequency response characteristic parameter of a filter having an output signal of an envelope detector as an input signal in response to the operation frequency channel being switched.

The device may further include a channel selector configured to select another frequency channel as the operation frequency channel in response to a determination result of whether the interference exists in the switched another frequency channel.

In another general aspect, a method of detecting an interference signal includes estimating a mean value of a received signals output from an analog-digital converter (ADC), filtering a low frequency band of the received signals using the estimated mean value to produce filtered received signals, detecting, from the filtered received signals, interference signals using a coherent modulation scheme and a non-coherent modulation scheme, and combining results of the interference signal detecting using the coherent modulation scheme and the non-coherent modulation scheme based on a preset condition and determining whether interference exists in a frequency channel in response to a result of the combining.

The detecting may include detecting a first interference signal using the coherent modulation scheme and detecting a second interference signal using the non-coherent modulation scheme.

The detecting may include detecting the interference signals selectively or simultaneously using the coherent modulation scheme and the non-coherent modulation scheme.

The detecting of the first interference signal may include detecting the first interference signal based on characteristics of signal waveforms at a start point and an end point of a predetermined detection window of the received signals.

The detecting of the first interference signal may include adjusting a detection parameter used for detecting the first interference signal, detecting a characteristic of a signal waveform at a start point of a predetermined detection window based on the detection parameter, detecting a characteristic of a signal waveform at an end point of the predetermined detection window based on the detection parameter, and determining whether the first interference signal exists based on the characteristic of the signal waveform occurring at the start point and the characteristic of the waveform occurring at the end point.

The detection parameter may include at least one of a threshold of an output magnitude of an LPF, a slope indicating a predetermined slope value on a time axis of an output of the LPF, or a time range.

In another general aspect, a computer program is embodied on a non-transitory computer readable medium, the computer program being configured to control a processor to perform the above method.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
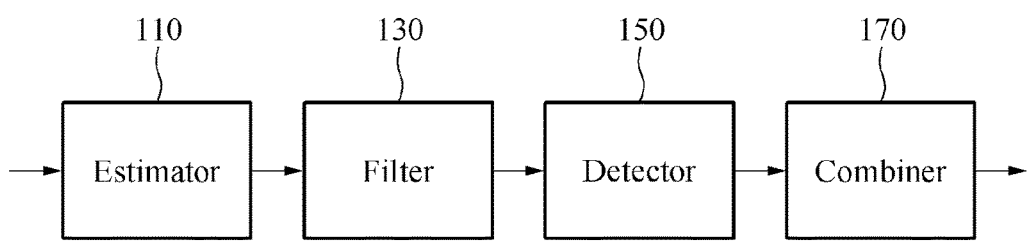
FIG. 1 is a block diagram illustrating a device for detecting an interference signal according to one or more example embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference is now made in further detail to example embodiments, examples of which are illustrated in the accompanying drawings, wherein like reference numerals refer to the like elements throughout. Embodiments are described further below in order to explain examples by referring to the figures.

FIG. 1 is a block diagram illustrating a device for detecting an interference signal according to one or more example embodiments.

Referring to the example of FIG. 1, a device for detecting an interference signal, hereinafter also referred to as an interference signal detecting device 100, includes an estimator 110, a filter 130, a detector 150, and a combiner 170. However, these are only examples of elements included in the interference signal detecting device 100, and other additional elements may be present in other examples, as appropriate.

The estimator 110 estimates a mean value of received signals output from an analog-digital converter (ADC). For example, the ADC may be an ADC of a receiver having a structure that allows it to function as an envelope detector.

The filter 130 filters a low frequency band of the received signals using the mean value estimated by the estimator 110 for removing or reducing a noise component included in the received signals.

The detector 150 detects, from the received signals that are filtered through the filter 130, interference signals using a coherent modulation scheme and a non-coherent modulation scheme.

The combiner 170 then combines results of the interference signal detecting, using the coherent modulation scheme and the non-coherent modulation scheme, and performs switching on the detection results based on a preset condition. Accordingly, the combiner 170 determines whether interference exists in a current frequency channel in response to a result of the combining.

Figure 2:
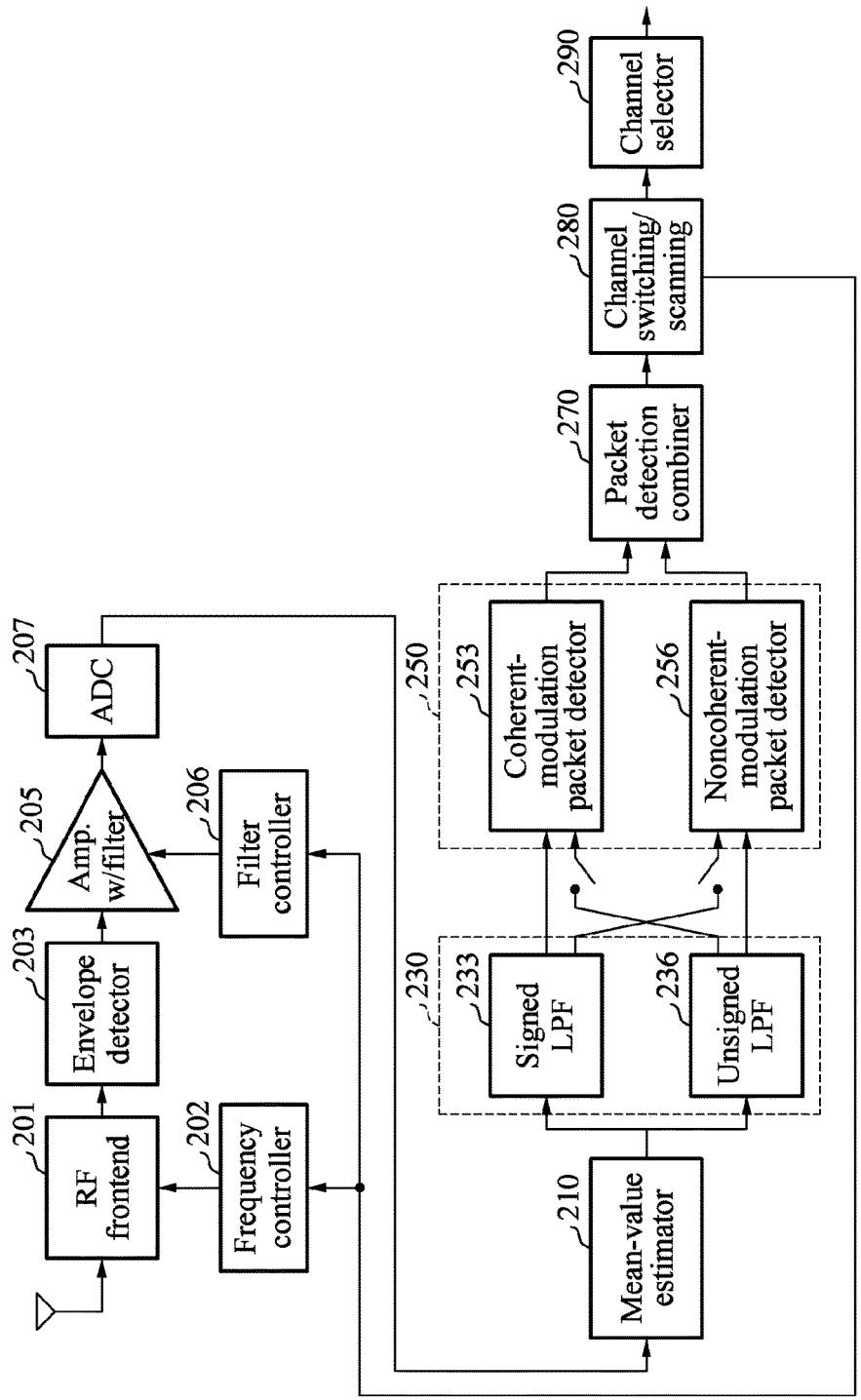
FIG. 2 is a system block diagram illustrating a device for detecting an interference signal from a low-power envelope detection receiver according to one or more example embodiments.

A structure of the interference signal detecting device 100 and an entire system configuration of a system embodiment that includes the interference signal detecting device 100 is described further with reference to the embodiment of FIG. 2.

Before further describing FIG. 2, an entire system configuration embodiment is described further for ease of understanding.

Various sensor devices included in a wireless sensor network and a local area network may require minimization, low-power consumption, and low complexity. Although a super heterodyne radio frequency (RF) structure may enhance aspects of performance, for example, sensitivity, by using an intermediate frequency band without directly converting a high frequency band to a base band, the complexity, cost, and an amount of power consumption of an entire system may be increased when using such an intermediate frequency approach.

In particular, a modem may require a relatively large amount of power in the super heterodyne RF structure, as compared to a digital baseband of the RF structure. For example, in a case of a modem chip for a low-rate wireless personal area network (WPAN) using a network technology established in Institute of Electrical and Electronics Engineers (IEEE) 802.15.4, an amount of power consumption of a digital signal processing portion may be approximately 0.5 milliwatts (mW) in a reception mode and a transmission mode. However, in such an example, the amount of power consumption for an analog signal processing portion may be, for example, 21 mW in a reception mode and the amount of power consumption of the analog signal processing portion may be, for example, 30 mW in a transmission mode. Thus, the analog signal processing portion may consume a relatively great amount of power, for example, approximately 40 to 60 times the power consumption, compared to the digital signal processing portion. Therefore, the analog signal processing portion consumes far more power than the digital signal processing portion, and accordingly saving power requires managing the power consumption that takes place during analog signal processing.

In particular, a receiver having a super-regenerative receiver structure may amplify a received signal based on a positive feedback scheme and then detects the received signal, thereby receiving attention as a desirable candidate for an ultra low-power receiver due to having simplicity in an RF structure designed for using a small number of active devices.

For example, a modulation scheme includes the coherent modulation scheme and the non-coherent modulation scheme.

The coherent modulation scheme is a scheme that detects carrier phase information in a transmission end from a reception end, and uses the carrier phase information for bit detection. By contrast, the non-coherent modulation scheme is a scheme that performs the bit detection without using the carrier phase information.

To achieve the low-power consumption and the low complexity effects, the non-coherent modulation scheme may be useful. For example, a modulation scheme such as a non-coherent on-off keying (OOK) and an amplitude-shift keying (ASK) may determine whether a signal exists using an envelope detector. Here, OOK is a simple form of ASK in which the presence or absence of a carrier wave represents digital data. ASK is more general, and represents digital data as variations in the amplitude of a carrier wave.

Performances of a non-coherent modulation scheme and a related non-coherent demodulation scheme may deteriorate more when compared to performances of a coherent modulation scheme and a corresponding coherent demodulation scheme. However, the non-coherent modulation scheme and the non-coherent demodulation scheme may not require a high-cost synchronization process for accurately calculating a carrier phase value. In addition, the non-coherent modulation scheme and the non-coherent demodulation scheme may decrease complexity and may save an amount of power by avoiding a requirement for using certain constituent components, such as, for example, a mixer and a linear amplifier used in an in-phase/quadrature-phase (I/O) structure, that consume a great amount of power, but are required for successful operation of a coherent modulation and a coherent demodulation scheme.

For example, in one or more embodiments of an RF receiver designed for ultra low-power reception and transmission, a modulation scheme, for example, the non-coherent OOK scheme, having low power and low complexity characteristics, may be used.

For example, the non-coherent modulation scheme may determine whether a signal exists by detecting an envelope of a received signal, such that an output of the envelope detector that has a positive value may cause a DC offset. Since the DC offset has a negative effect on an entire circuit operation, the DC offset may be removed, accordingly.

For example, when a receiver having a superregenerative receiver structure is used, an oscillation signal of an oscillator may be input into the envelope detector. Since an output signal of the envelope detector has a relatively weak intensity, the output signal may be amplified by passing it through a variable gain amplifier (VGA).

In this example, the VGA may amplify a signal so that it has an intensity greater than or equal to 40 decibels (dB). Thus, when a DC offset component exists in the output signal of the envelope detector, a signal excessively amplified due to the DC offset component may saturate an entire circuit. To maintain low-power consumption and prevent a DC offset from occurring due to the output signal of the envelope detector having a positive value, the VGA that has a frequency response characteristic that is able to control a low frequency signal component may be used.

Since a low-power receiver and a low-power transmitter basically are designed to consume a small amount of power when a signal is received and transmitted, reliability of communication may deteriorate when a relatively strong outside interference signal exists. For example, when the outside interference signal exists, the receiver and the transmitter may fail to transmit a signal or packet in one transmission operation, and therefore it is required to transmit the signal or packet by repeated transmission operations, such that the amount of power consumption may increase. Thus, it is desirable to determine whether the outside interference signal exists in a current channel through which a signal is to be transmitted, and to transmit a corresponding signal when the outside interference signal does not exist. By operating in such a manner, it is possible to reduce the effects of such outside interference that otherwise would increase power consumption.

Hereinafter, a "signal" is to be understood as including a packet used for data transmission and receiving.

As described above, a receiver structure of a low-power envelope detector from which the DC offset is removed may have an issue of detecting the outside interference signal when using the coherent modulation scheme. Since the signal using the coherent modulation scheme differentiates signals based on different phase values, an output value of the envelope detector may be maintained as an identical value, regardless of characteristics of a transmission signal. Accordingly, such a signal using the coherent modulation scheme may be regarded as a noise component when the DC offset is removed. The coherent modulation scheme may have difficulty in detecting the outside interference signal.

An interference signal may include the outside interference signal when using the coherent modulation scheme in addition to interference signals due to other neighboring devices also using the non-coherent modulation scheme.

FIG. 2 is a system block diagram illustrating a system and a device for detecting an interference signal from a low-power envelope detection receiver according to one or more example embodiments.

In an embodiment, for convenience of explanation, it will be assumed that the non-coherent modulation scheme is used. FIG. 2 illustrates a system structure in which an envelope detector is applied to a receiver embodiment.

When a reception signal input via RF frontend 201 is received through an envelope detector 203, the reception signal passes through an amplifier 205 to amplify a weak signal. Here, because an output of the envelope detector 203 generally has a positive value, the output of the envelope detector 203 may include a DC offset component. Thus, the DC offset component included in the output of the envelope detector 203 may be also amplified such that an entire circuit may be saturated as a result of the amplification.

To prevent such a saturation phenomenon, a filtering operation of amplifying a signal and simultaneously reducing a low frequency component of the signal in a frequency response characteristic may be performed in the amplifier 205. Thus, the amplifier 205 includes an appropriate filter to perform such an operation.

The signal amplified by reducing the low frequency component may be converted to a digital signal by passing the signal through an analog-to-digital converter (ADC) 207. An interference signal detecting device may detect interference by receiving the signal that was converted to the digital signal by passing the signal through the ADC 207.

Below, a structure and an operation of the interference signal detecting device are described further.

In the interference signal detecting device, an estimator 210 estimates a mean value of received signals, for example, digital signals output from the ADC 207. Since the mean value of the received signals includes significant information corresponding to a reference value in a subsequent interference detecting process that facilitates such a process, the mean value may be estimated in advance in this example. The estimator 210 is also optionally referred to as a mean-value estimator.

In such an embodiment, a filter 230 filters a low frequency band of the received signals by using the mean value estimated by the estimator 210. The filter 230 may include a discrete-time low pass filter (LPF), which is adapted to perform such a type of filtering. Such filtering may remove or reduce an irregularly changing noise component included in the received signals. The filter 230 may reduce the drastically changing noise component between neighboring reception samples by giving priority to outputting the low frequency component.

For example, the filter 230 includes a signed LPF 233 and an unsigned LPF 236.

In such an example, the signed LPF 233 may have a positive component and a negative component as an output of an LPF, and the unsigned LPF 236 may have the positive component as the output of the LPF.

In this example, the filter 230 may use the signed LPF 233 to detect the outside interference signal using the coherent modulation scheme, and the filter 230 may use the unsigned LPF 236 to detect the outside interference signal using the non-coherent modulation scheme. Because these filters produce signals that include or lack signed components in this manner, for example, depending on embodiment, they are adapted to use a coherent or non-coherent modulation scheme in that these modulation schemes are adapted to signals with these characteristics.

To enhance performance in detecting the outside interference signal using the coherent modulation scheme, the signed LPF 233 may be simultaneously used with the unsigned LPF 236 according to circumstances in examples. To enhance performance in detecting the outside interference signal using the non-coherent modulation scheme, the unsigned LPF 236 may be simultaneously used with the signed LPF 233 according to circumstances in examples.

In an example, the low frequency band of the received signals is filtered, such that the signed LPF 233 and the unsigned LPF 236 are simultaneously or selectively used according to circumstances in examples in order to successfully detect the outside interference signals appropriately using the coherent modulation scheme and the non-coherent modulation scheme.

A detector 250 detects, from a signal filtered through the filter 230, interference signals using the coherent modulation scheme and the non-coherent modulation scheme. The detector 250 includes a first detector 253 configured to detect a first interference signal and a second detector 256 configured to detect a second interference signal using the non-coherent modulation scheme.

For example, the detector 250 may detect the interference signals by simultaneously or selectively using the first detector 253 and the second detector 256. The first detector 253 is alternatively referred to as a coherent modulation packet detector, and the second detector 256 is alternatively referred to as a non-coherent modulation packet detector.

The second detector 256 may also include a detection parameter setter used to set a detection parameter for detecting the second interference signal in a predetermined detection window of the received signals and a second determiner to determine whether the second interference signal exists based on the detection parameter. For example, at least one of a threshold of an output magnitude of the LPF and a time margin may be used as the detection parameter. For illustration purposes and not limited thereto, the detection parameter setter and the second determiner may be analogous to related elements of the first detector 253 that are illustrated in further detail, below, in FIG. 4. For example, the detection parameter setter of the second detector 256 may be analogous to the detection parameter adjuster 410 and the second determiner of the second detector 256 may be analogous to the first determiner 470. However, further aspects of the second detector are also discussed, below.

Detailed descriptions of such first and second detectors, for example, similar to the first detector 253 and the second detector 256 are respectively provided in further detail with reference to FIGS. 3A through 14.

A combiner 270 combines detection results of each interference signal detected by the detector 250 using the constituent detectors of the detector 250 based on a preset condition or a desired signal processing method. For example, the preset condition and the desired signal processing method may perform an AND operation or an OR operation with respect to a detection result of the first detector 253 and a detection result of the second detector 256, or alternatively may use a detection result of any one of the first detector 253 and the second detector 256 based on a statistical distribution characteristic corresponding to the received signals.

For example, the combiner 270 may perform outputting by performing the AND operation with respect to the detection result of the first detector 253 and the detection result of the second detector 256. In this example, the combiner 270 may finally determine that the interference signals exist in a current channel in response to the interference signals being detected by the first detector 253 and the second detector 256.

For example, the combiner 270 may perform outputting by performing the OR operation with respect to the detection result of the first detector 253 and the detection result of the second detector 256. In this example, the combiner 270 finally determines that the interference signals exist in the current channel in response to the detection result of interference signals being detected by any one of the first detector 253 and the second detector 256.

The combiner 270 may selectively perform switching on the detection result of any one of the first detector 253 and the second detector 256 based on the statistical distribution characteristic of current received signals and may output such a detection result. When an ADC output value is a value greater than or equal to a predetermined ratio, such as, for example, a value greater than or equal to a predetermined threshold value at a predetermined rate during a predetermined interval, a corresponding interference signal may be determined to be the interference signal using the coherent modulation scheme. In this example, the combiner 270 may perform switching on the output value of the first detector 253 and then output the output value of the first detector 253.

The combiner 270 may determine whether the interference exists in a current frequency channel based on analyzing output values of the detection results of the first detector 253 and the second detector 256. For example, the combiner 270 is also referred to as a packet detection combiner.

In the embodiment of FIG. 2, a channel switch 280 switches an operation frequency channel to another frequency channel based on a result of the determining performed by the combiner 270, that is, based on whether the interference is determined to exist in the current frequency channel. The channel switch 280 may switch the operation frequency channel to another frequency channel through a frequency controller 202 in response to the interference existing in the current frequency channel, and then iteratively perform the aforementioned interference detecting process.

During a process of switching operation frequency channels, for example, during a switching time of the frequency channel or after the switching of the frequency channel, the channel switch 280 may adjust a frequency response characteristic parameter of a filter. For example, the filter may be the amplifier 205 provided in an analog block through a filter controller 206. For example, the filter in the analog block may set the output signal of the envelope detector as an input signal.

For example, the frequency response characteristic parameter may be used to enhance and guarantee reliability of interference signal detection by adjusting an amount of offsetting of the DC offset component.

In such an embodiment, a channel selector 290 selects another frequency channel as the operation frequency channel based on a result of determining whether the interference exists in the switched other frequency channel. For example, the channel selector 290 may receive and transmit a signal to a corresponding channel more successfully by selecting a frequency channel in which the interference does not exist.

Subsequently, a signal processing process in each constituent element is described in further detail.

A signal processing process in the estimator 210, the signed LPF 233, and the unsigned LPF 236 operates as follows.

For example, when an i-th ADC output sample is represented as y(i), the estimator 210 may calculate a mean value represented as mean(i) as shown in Equation 1.

$$\text{mean}(i) = \frac{1}{N_{mean}} \sum_{j=1}^{N_{mean}} y(i-(j-1)) \quad \text{Equation 1}$$

As provided in Equation 1, a value of $N_{mean}$ corresponds to a number of samples used for calculating a mean value.

Also, the mean value may not be updated to be a new value for each sample. Instead, the mean value may be updated when samples are accumulated by a predetermined number.

For example, the signed LPF 233 may process a signal in order to filter a discrete-time low frequency band by using the estimated mean value. For example, the signed LPF 233 may generate a positive value and a negative value, for example, a positive signal component and a negative signal component, as output values as provided in Equation 2.

$$z1(i) = \sum_{j=1}^{N_{tap}} (y(i-(j-1)) - \text{mean}(i)) \quad \text{Equation 2}$$

In an example, a value of $N_{tap}$ corresponds to a number of filter taps, where a filter tap is a value of a signal used in the summation as an input to filter the signal. In such an example, the number of the filter taps indicates a total number of input variables to be used as inputs in a predetermined filter. z1(i) denotes a value obtained by adding $N_{tap}$ to a value obtained by subtracting the mean value from an ADC sample value.

Subsequently, for example, the unsigned LPF 236 may generate the positive value, for example, the positive signal component, as an output as provided in Equation 3.

$$z2(i) = \sum_{j=1}^{N_{tap}} |y(i-(j-1)) - \text{mean}(i)| \quad \text{Equation 3}$$

z2(i) denotes a value obtained by adding $N_{tap}$ to an absolute value obtained by subtracting the mean value from the ADC sample value.

An example of an operation of the first detector 253 is described further, below.

In a case of a signal or a packet on which coherent modulation is performed, an envelope in a predetermined size may consistently occur in the output of the envelope detector 203, because a signal is transmitted using an approach based on a difference of phases. When a predetermined DC offset occurs and a value of the DC offset is consistently removed, a component generated due to a signal may be removed and a component generated due to a noise may be output to the ADC 207. Thus, in a circumstance in which the DC offset is removed, it becomes difficult to detect an interference signal that remains.

Accordingly, the first detector 253 detects the interference signal based on characteristics of signal waveforms occurring at a start point and an end point occurring during a predetermined detection window of the received signal or packet.

Although the value of the DC offset due to the noise is removed, because the noise exists at a start point of the received signal before the signal is received, fluctuation of a signal may still occur since an envelope component is additionally generated due to characteristics of the received signal. After the signal is received, a signal having a pulse form in an upward direction based on an intermediate value may be generated. Subsequently, the DC offset value that is increased due to a signal component may be applied to a signal waveform, and the noise component may still exist when the value of the DC offset is removed.

However, because the value of the DC offset occurring due to the increased signal component is removed before the end point of the predetermined detection window of the received signals, a pulse may suddenly occur in a downward direction in response to the received signal terminating. Thus, a signal having a pulse form directed in a downward direction based on the intermediate value may be generated.

In an example, the first detector 253 may be aware of an existence of the interference signal after a start signal is detected until an end signal appears based on a characteristic of a signal waveform indicating a start signal and an end signal of the predetermined detection window of the received signals. When the start signal is not detected in the predetermined detection window while the end point is detected, the first detector 253 may determine that the interference signal disappears and the interference signal does not exist in a corresponding window of a corresponding frequency channel.

When detection is performed while the received signal or packet is received because the start point of the detection window occurs after an original start point at which the received signal is originally received, there is no issue of performing signal processing with respect to the determining of whether the interference signal exists, because the received signal having a large pulse form is generated directed in the upward direction from the start point of the detection window.

Figure 4:
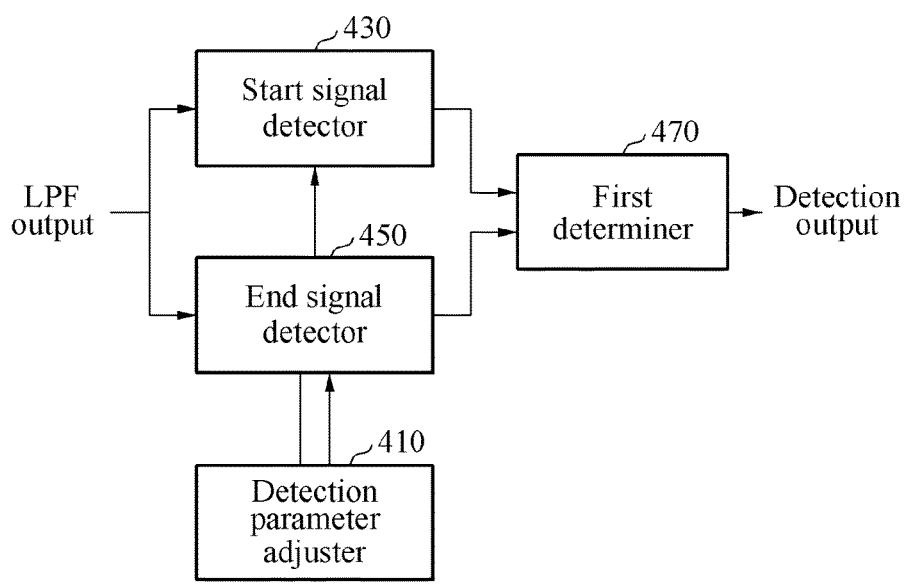
FIG. 4 is a block diagram illustrating a first detector of a device for detecting an interference signal according to one or more example embodiments.

Further detailed descriptions of a structure of the first detector 253 are provided with reference to the embodiment of FIG. 4.

Figure 3:
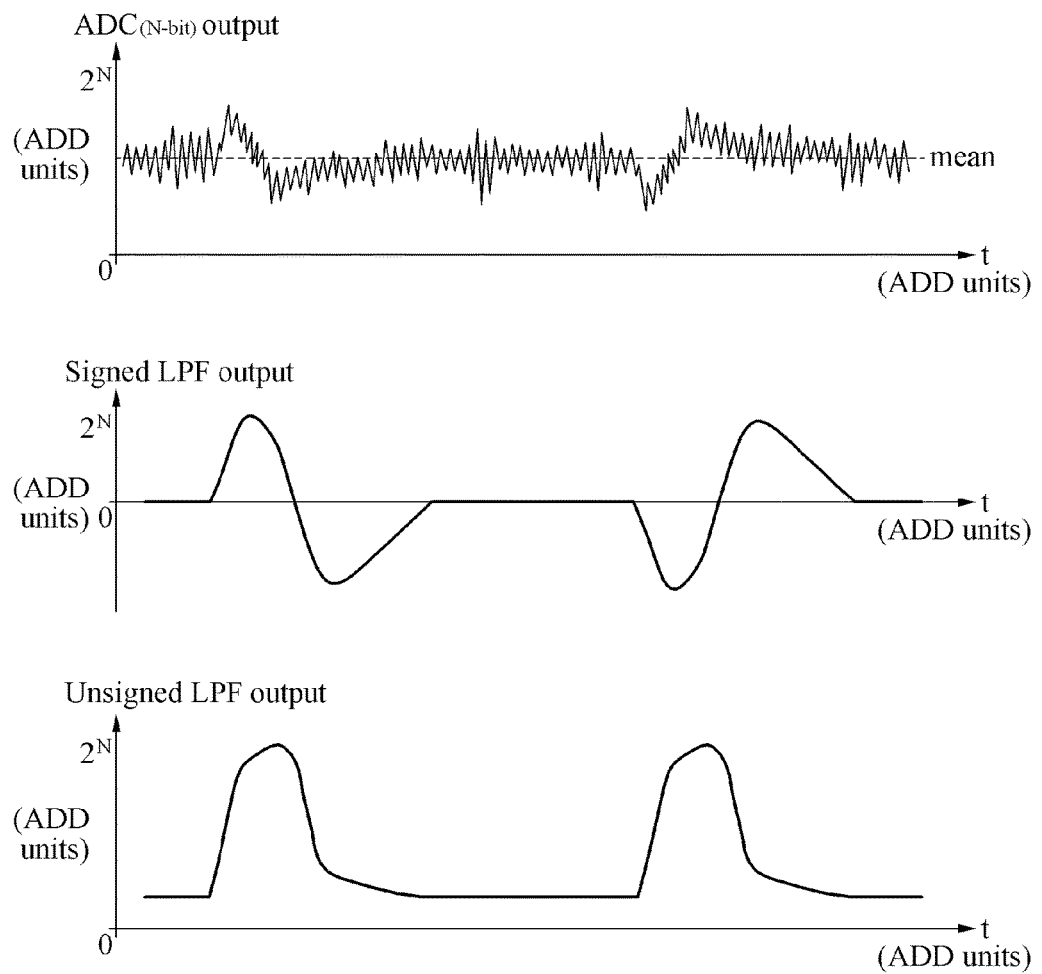
FIG. 3 is a graph illustrating outputs of filters and an analog-digital converter (ADC) output when a signal using a coherent modulation scheme is received according to one or more example embodiments.

FIG. 3 is a graph illustrating outputs of filters and an analog-digital converter (ADC) output produced when a signal using a coherent modulation scheme is received according to one or more example embodiments.

FIG. 3 illustrates an example of a signal waveform of an ADC output and examples of signal waveforms of a signed low pass filter (LPF) and an unsigned LPF when a signal using a coherent modulation scheme is received.

After a signal is passed through the signed LPF to remove an irregular noise component from the ADC output, the ADC output may have a relatively clear form, with a reduced noise component. However, the signed LPF may not completely remove the noise, and remaining noise components in the output of the signed LPF may be ignored, as illustrated in the example of FIG. 3. Three examples in which interference is detected using the coherent modulation scheme are described further with reference to FIGS. 5 through 10. These examples may be applied to the signal waveforms illustrated in the example of FIG. 3.

FIG. 4 is a block diagram illustrating a first detector of a device for detecting an interference signal according to one or more example embodiments.

Referring to FIG. 4, a first detector 400 includes a detection parameter adjuster 410, a start signal detector 430, an end signal detector 450, and a first determiner 470.

However, these are only example elements, and in other embodiments the first detector 400 may include other elements, as appropriate.

In the embodiment of FIG. 4, the detection parameter adjuster 410 adjusts a detection parameter used for detecting a first interference signal. Here, "adjusting a detection parameter" may be understood as including selecting or combining detection parameters. For example, the detection parameter includes at least one of a threshold of an output magnitude of a low pass filter (LPF) and a slope indicating a predetermined slope value on a time axis of an output of the LPF, and a related time range.

Also, in the embodiment of FIG. 4, the start signal detector 430 detects a characteristic of a signal waveform at a start point of a predetermined detection window based on the detection parameter.

Furthermore, the end signal detector 450 detects a characteristic of a signal waveform at an end point of the predetermined detection window based on the detection parameter.

Based on these detection operations, the first determiner 470 determines whether the first interference signal exists based on the characteristic of the signal waveform at the start point and the characteristic of the signal waveform at the end point. In this example, the characteristics of the signal waveforms may include signal waveforms having different directions.

Figure 5:
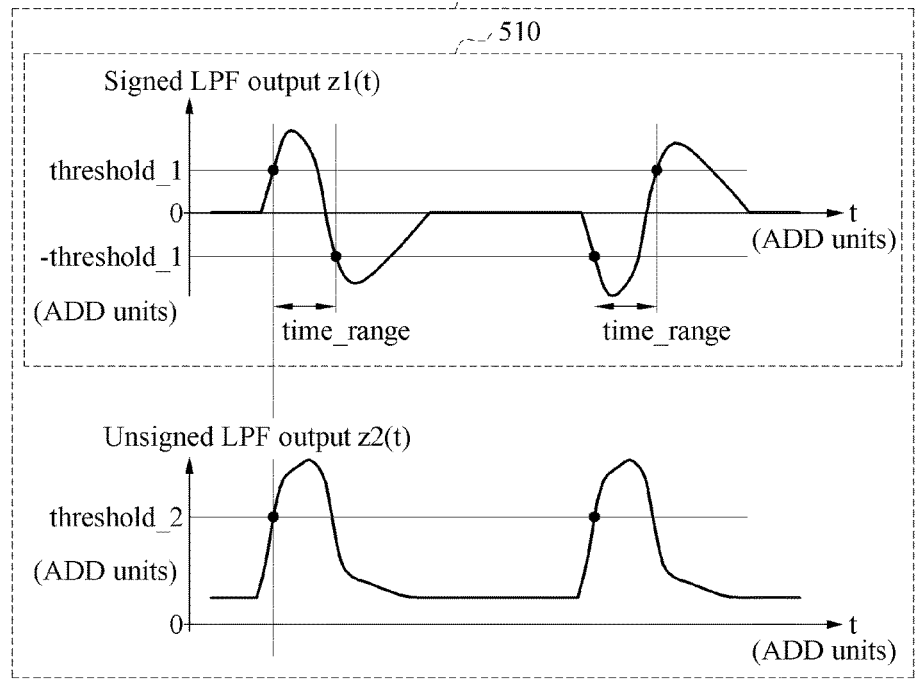
FIG. 5 illustrates an example of detecting, based on a threshold, interference by a first detector of a device for detecting interference according to one or more example embodiments.
Figure 6:
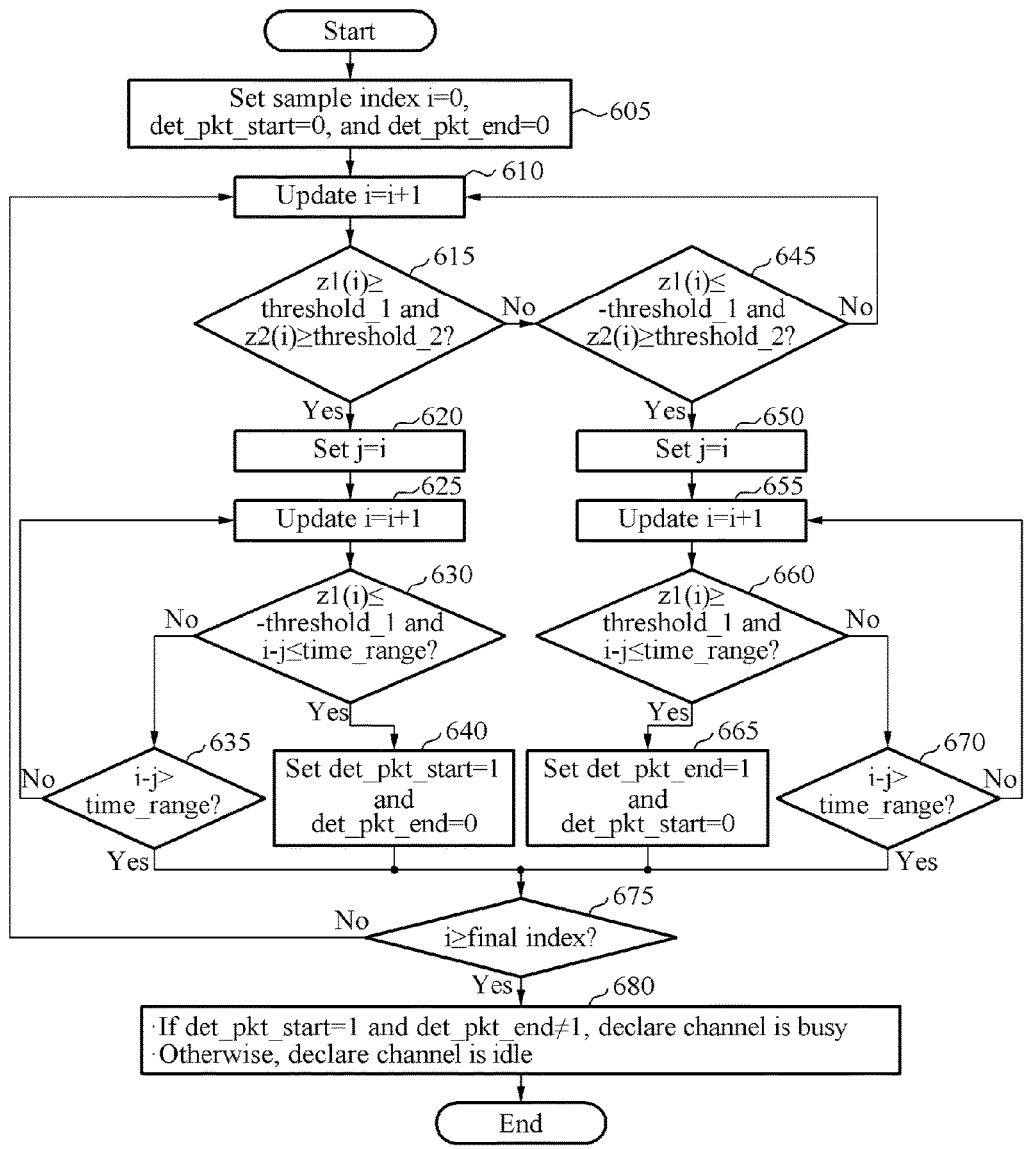
FIG. 6 is a flowchart illustrating an example of detecting, based on a threshold, interference by a first detector of a device for detecting interference according to one or more example embodiments.

FIG. 5 illustrates an example of detecting, based on a threshold, interference by a first detector of a device for detecting interference according to one or more example embodiments, and FIG. 6 is a flowchart illustrating an example of detecting, based on a threshold, interference by a first detector of a device for detecting interference according to one or more example embodiments.

FIG. 5 illustrates an example of detecting interference by setting a predetermined threshold of an output magnitude of a low pass filter (LPF) as a detection parameter. Accordingly, FIG. 5 illustrates an example of signal processing when a signed LPF and when an unsigned LPF are used.

In such an example, threshold values threshold_1 and threshold_2 with respect to output magnitudes of the signed LPF and the unsigned LPF and a time range time_range may be set as detection parameters for detecting an interference signal.

In FIG. 5, a graph 510 illustrates an example of detecting interference when the signed LPF is used, and a graph 520 illustrates examples of detecting the interference when the signed LPF and the unsigned LPF are both used.

Referring to FIG. 6, the method steps may be performed by an interference detecting device, subsequently also referred to as a detecting device.

In operation 605, the method generates an output z1(i) of the signed LPF and an output z2(i) of the unsigned LPF through an analog-digital converter (ADC) output to be received, and sets a value of a sample index i, and a start point det_pkt_start of an interference detection packet, and an end point det_pkt_end of the interference detection packet to be 0.

The method increases the value of the sample index i by 1 in operation 610. The method determines whether z1(i) is greater than or equal to threshold_1 and z2(i) is greater than or equal to threshold_2 in operation 615.

When z1(i) is greater than or equal to threshold_1 and z2(i) is greater than or equal to threshold_2, the method may determine that a corresponding signal satisfies a first condition being a start point of a packet, for example, a predetermined detection window of a received signal.

Thus, the method sets a value of a corresponding sample index to be a value of a sample index j in operation 620 and then increases the value of the sample index by 1 in operation 625.

When a value of z1(i) is less than −threshold_1 within a predetermined sample index, for example, in a sample i−j≤time_range within time_range in operation 630, the method determines that the corresponding signal is a start point of the packet, and sets an indicator of the start point det_pkt_start of the interference detection packet to be 1 and an indicator of the end point det_pkt_end of the interference detection packet to be 0 in operation 640.

When the foregoing condition is not satisfied in operation 630, the method determines whether the predetermined sample index is greater than time_range in operation 635.

Based on a result of the determining that the predetermined sample index is greater than time_range in operation 635, the method determines whether the predetermined sample index is a final index in operation 675.

Based on a result of the determining that the predetermined sample index is less than or equal to time_range in operation 635, the method increases the value of the sample index i by 1 in operation 625.

When z1(i) is less than threshold_1 and z2(i) is less than threshold_2 in operation 615, the method determines whether z1(i) is less than or equal to −threshold_1 and z2(i) is greater than or equal to threshold_2 in operation 645.

When z1(i) is less than or equal to −threshold_1 and z2(i) is greater than or equal to threshold_2, the method determines that the corresponding signal satisfies a condition corresponding to an end point of the packet, for example, the predetermined detection window of the received signal. Thus, the method sets the value of the sample index i to be value of the sample index j in operation 650 and then increases the value of the sample index i by 1 in operation 655.

In operation 660, the method determines whether z1(i) is greater than or equal to threshold_1 within the predetermined sample index, for example, in the sample i−j≤time_range within time_range.

Based on a result of the determining that z1(i) is greater than or equal to threshold_1 in the sample within time_range in operation 660, the method determines that the corresponding signal is the end point of the packet, and sets the indicator of the end point det_pkt_end of the interference detection packet to be 1 and the indicator of the start point det_pkt_start of the interference detection packet to be 0 in operation 665.

When the foregoing condition is not satisfied in operation 660, the method determines whether a value of a sample index i−j is greater than time_range in operation 670.

Based on a result of the determining that the value of the sample index i−j is less than or equal to time_range in operation 670, the method increases the value of the sample index by 1 in operation 655.

Based on the result of the determining that the value of the sample index i−j is greater than time_range in operation 670, the method determines whether the corresponding sample index is the final index in operation 675.

Based on a result of the determining that the corresponding sample index is not the final index in operation 675, the method increases the sample index i by 1 in operation 610.

Based on the result of the determining that the corresponding sample index is the final index in operation 675, the method outputs an interference detection result in operation 680.

When the start point det_pkt_start of the interference detection packet and the end point det_pkt_start of the interference detection packet are set as 1, the detecting device determines that a corresponding frequency channel is in a busy state, or otherwise, the detecting device determines that the corresponding frequency channel is in an idle state.

Figure 7:
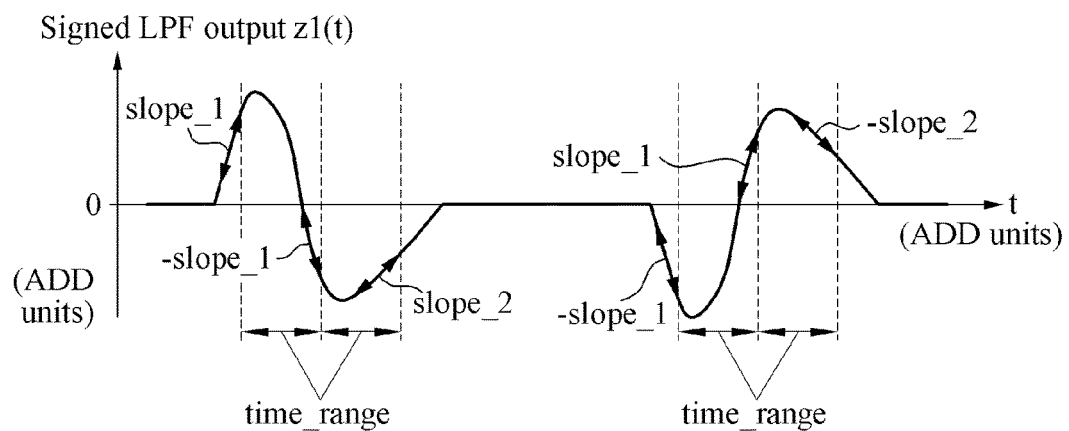
FIG. 7 is a graph illustrating an example of detecting, based on a slope, an interference signal by a first detector of a device for detecting interference according to one or more example embodiments.

FIG. 7 is a graph illustrating an example of detecting, based on a slope value, an interference signal by a first detector of a device for detecting interference according to one or more example embodiments.

FIG. 7 illustrates an example of detecting interference by setting, as a detection parameter, a slope indicating a predetermined slope value with respect to a time axis of an output of a low pass filter (LPF). FIG. 7 illustrates an example of signal processing when a signed LPF is used without using an unsigned LPF as well.

In an example, slopes slope_1 and slope_2 indicating predetermined slope values on a time axis of an output of an LPF and a time range time_range may be set as a detection parameter for detecting an interference signal.

A detecting device generates an output signal $z1(i)$ derived from the signed LPF through an analog-digital converter (ADC) output that is received.

When a slope of a current time axis of the signal $z1(i)$ is greater than slope_1, the detecting device may determine that a received signal or a packet satisfies a first condition of a start signal. Subsequently, when a slope value is less than −slope_1 within a sample index of time_range, the detecting device may determine that the received signal satisfies a second condition.

When the slope value is greater than slope_2 within the sample index of time_range, the detecting device may determine that a point of a corresponding index is to be identified as being a start point of the received signal. For example, the detecting device may store a predetermined number of previous $z1(i)$ values and then obtain a slope value based on a difference between a current $z1(i)$ value and the previous $z1(i)$ values.

Accordingly, when a slope of $z1(i)$ is less than _slope_1, greater than slope_1 within the sample index of time_range, and less than −slope_2 within the sample index of time_range in such an order, the detecting device may determine that the corresponding signal waveform is to be identified as being an end of a packet. Additionally details of the operation of the aforementioned detecting are illustrated in FIG. 8.

Figure 8:
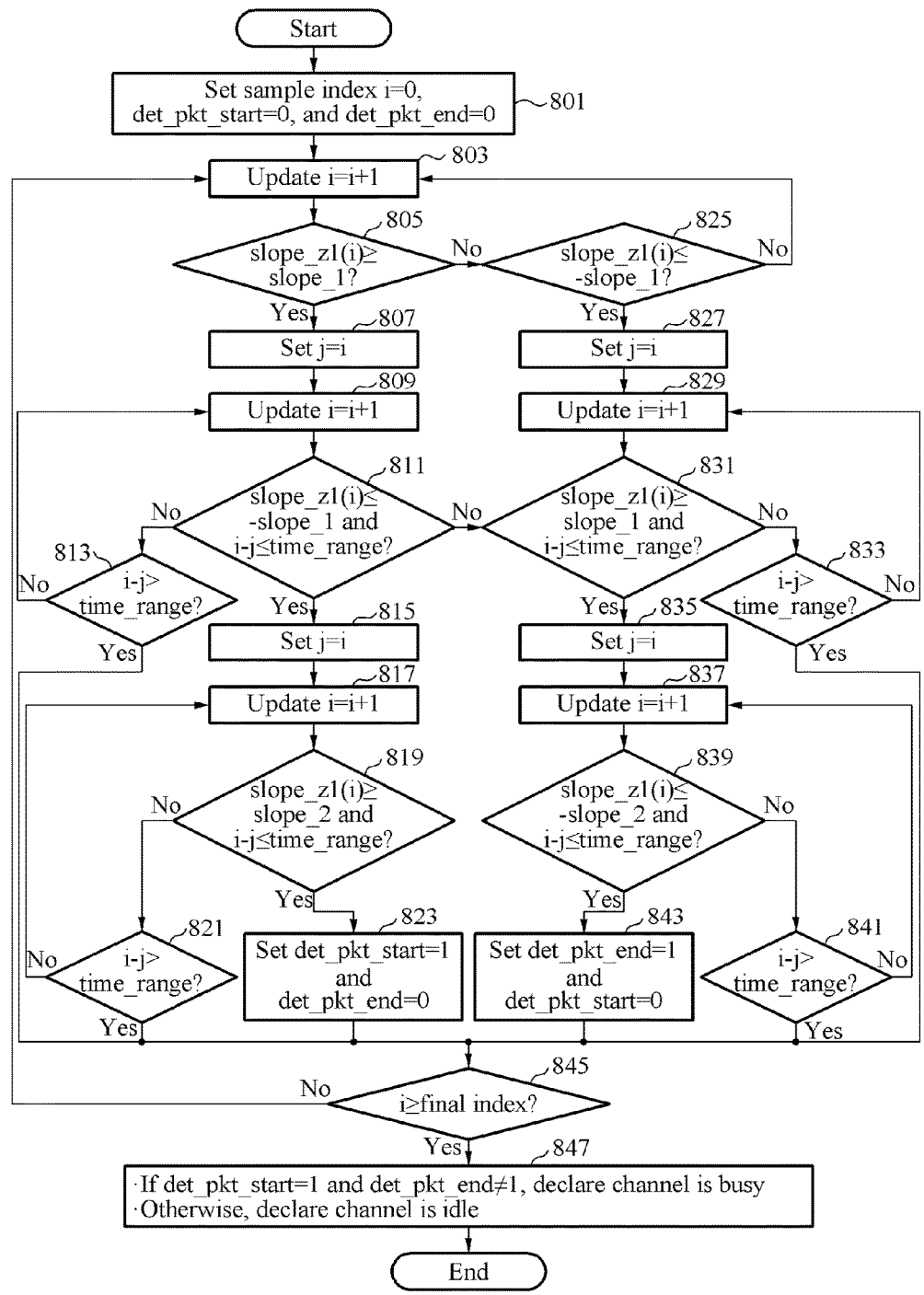
FIG. 8 is a flowchart illustrating an example of detecting, based on a slope, an interference signal by a first detector of a device for detecting interference according to one or more example embodiments.

FIG. 8 is a flowchart illustrating an example of detecting, based on a slope, an interference signal by a first detector of a device for detecting interference according to one or more example embodiments. In FIG. 8, the operations included in the method are performed by a detecting device, such as the detecting device of FIGS. 1-7, noting that embodiments are not limited thereto.

Referring to the example of FIG. 8, such a detecting device may use a signed low pass filter (LPF) without using an unsigned LPF. In such an example, slopes slope_1 and slope_2 indicate predetermined slope values on a time axis of an output of an LPF, and a time range time_range may be set as a detection parameter for detecting an interference signal.

In operation 801, the method generates a slope slope_z1 (i) indicating a predetermined slope value on the time axis of the output through an analog-digital converter (ADC) output to be received, and then sets a value of a sample index i, a start point det_pkt_start of an interference detection packet, and an end point det_pkt_end of the interference detection packet to each be 0.

The method increases the value of the sample index i by 1 in operation 803, and then determines whether slope_z1(i) is greater than or equal to slope_1 in operation 805.

When slope_z1(i) is greater than or equal to slope_1 in operation 805, the method determines that a corresponding signal satisfies a first condition used to determine a start signal of a received signal or packet. Thus, the method sets the value of the sample index i to be a value of a sample index j in operation 807, and then increases the value of the sample index by 1 in operation 809.

In operation 811, the method determines whether the sample index is within a range of sample index i−j≤time_range of time_range and slope_z1(i), for example, a slope value as discussed further above, is less than or equal to −slope_1. When the sample index is within a range of sample index i−j≤time_range of time_range and slope_z1(i) is less than or equal to −slope_1 in operation 811, the method sets the value of the sample index i to be the value of the sample index j in operation 815, and then increases the value of the sample index by 1 in operation 817.

When the sample index is not within the sample range of index i−j≤time_range of time_range or when slope_z1(i) is greater than −slope_1 in operation 811, the method determines whether the value of the sample index satisfies the condition of i−j >time_range in operation 813.

When a value of a sample index i−j is greater than time_range in operation 813, the method determines whether a corresponding sample index is a final index in operation 845.

When the value of the sample index i−j is less than or equal to time_range in operation 813, the method increases the value of the sample index i by 1 in operation 809.

Subsequent to operation 817, the method determines whether the sample index is within the range sample index i−j≤time_range of time_range and whether slope_z1(i) is greater than or equal to slope_2 in operation 819.

Based on a result of the determining that the sample index is within the range of sample index i−j≤time_range of time_range and that slope_z1(i) is greater than or equal to slope_2 in operation 819, the method determines that a corresponding signal is to be identified as a start of the interference detection packet, and sets an indicator of the start point det_pkt_start of the interference detection packet to be 1 and an indicator of the end point det_pkt_end of the interference detection packet to be 0 in operation 823.

In operation 845, the method determines whether the corresponding sample index is a final index.

Based on a result of the determining that the corresponding sample index is the final index in operation 845, the method outputs an appropriate interference detection result in operation 847.

Based on a result of the determining that the sample index is not within the range of sample index i−j≤time_range of time_range and slope_z1(i) is less than or equal to slope_2 in operation 819, the method determines whether the sample index is greater than the sample index i−j>time_range of time_range in operation 821.

When the foregoing condition is satisfied in operation 821, the method determines whether the corresponding sample index is the final index in operation 845, and when the condition is not satisfied in operation 821, the method increases the value of the sample index by 1 in operation 817.

In operation 825, the method determines whether slope_z1(i) is less than or equal to −slope_1 when slope_z1(i) is determined to be less than slope_1 in operation 805.

When slope_z1(i) is determined to be greater than −slope_1 in operation 825, the method returns to operation 803 to increase the value of the sample index by 1.

When slope_z1(i) is less than or equal to −slope_1 in operation 825, the method sets the value of the sample index i to be the value of the sample index j in operation 827, and then increases the value of the sample index by 1 in operation 829.

In operation 831, the method determines that the sample index is within the range that satisfies sample index i−j≤time_range of time_range and that slope_z1(i) is greater than or equal to slope_1.

When the sample index is not within the range that satisfies sample index i−j≤time_range of time_range or slope_z1(i) is less than slope_1 in operation 831, the method determines whether the sample index of time_range satisfies i−j>time_range in operation 833.

When the condition is satisfied in operation 833, the method determines whether the corresponding sample index is the final index in operation 845. Based on a result of the determining that the corresponding sample index is the final index in operation 845, the method outputs an interference detection result in operation 847. Based on a result of the determining that the corresponding sample index is not the final index in operation 845, the method increases the sample index by 1 in operation 803.

When the tested condition is not satisfied in operation 833, the method increases the sample index by 1 in operation 829.

When the sample index is within the range of sample index i−j≤time_range of time_range or slope_z1(i) is greater than or equal to slope_1 in operation 831, the method sets the value of the sample index i to be the value of the sample index j in operation 835 and then increases the value of the sample index by 1 in operation 837.

Subsequent to operation 837, the method determines whether the sample index is within the range of sample index i−j≤time_range of time_range or slope_z1(i) is less than or equal to slope_2 in operation 839.

When the sample index is not within the range of sample index i−j≤time_range of time_range or slope_z1(i) is greater than slope_2 in operation 839, the method determines whether the value of the sample index satisfies i−j>time_range in operation 841.

When the value of the sample index i−j is greater than time_range in operation 841, the method determines whether the corresponding sample index is the final index in operation 845. When the value of the sample index i−j is less than or equal to time_range in operation 841, the method increases the value of the sample index by 1 in operation 837.

When the sample index is within the sample index i−j≤time_range of time_range or slope_z1(i) is less than or equal to slope_2 in operation 839, the method determines that the corresponding signal is an end of the interference detection packet, and accordingly sets the indicator of the end point det_pkt_end of the interference detection packet as 1 and the indicator of the start point det_pkt_start of the interference detection packet as 0 in operation 843.

Subsequent to operation 843, the method determines whether the corresponding sample index is the final index in operation 845. Based on the result of the determining that the corresponding sample index is the final index in operation 845, the method outputs the interference detection result in operation 847. Based on the result of the determining that the corresponding sample index is not the final index in operation 845, the method increases the sample index by 1 in operation 803.

When the start point det_pkt_start of the interference detection packet and the end point det_pkt_start of the interference detection packet are set to be 1 in operation 847, the method determines that a corresponding frequency channel is in a busy state, or otherwise, the method determines that the corresponding frequency channel is determined to be in an idle state.

Figure 9:
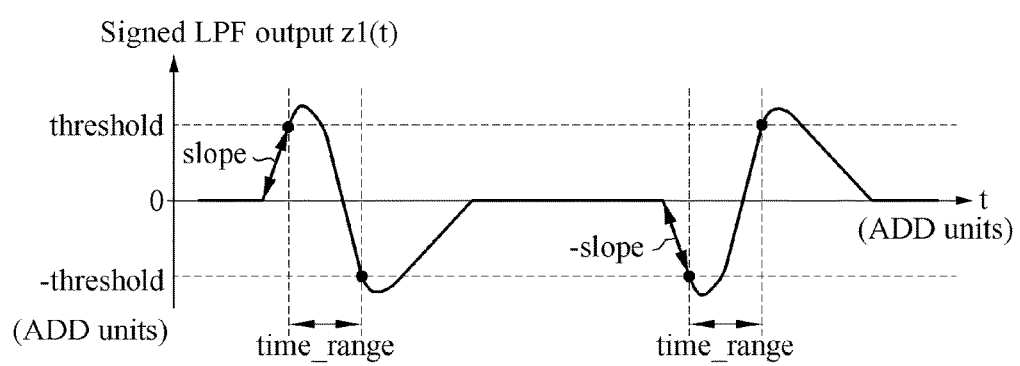
FIG. 9 is a graph illustrating an example of detecting, based on a threshold and a slope, an interference signal by a first detector of a device for detecting interference according to one or more example embodiments.

FIG. 9 is a graph illustrating an example of detecting, based on a threshold and a slope, an interference signal by a first detector of a device for detecting interference according to one or more example embodiments.

FIG. 9 illustrates an example of detecting interference by setting, as a detection parameter, a predetermined threshold of an output magnitude of a low pass filter (LPF) and a slope indicating a predetermined slope value on a time axis of an output of the LPF.

FIG. 9 illustrates an example of signal processing that occurs when a signed LPF is used without using an unsigned LPF.

For example, a detecting device may generate an output z1(i) of the signed LPF through an analog-digital converter (ADC) output that is to be received, and then determine that a first condition of a packet start signal is satisfied when a slope of a current time axis of z1(i) is greater than the value of slope_1 and a value of z1(i) is also greater than a threshold.

The detecting device determines that a point of a corresponding sample index is to be considered a start of a packet when the value of z1(i) is less than the threshold within a sample index of time_range.

When the slope of the current time axis of z1(i) is less than the value of −slope_1 and z1(i) is also less than −threshold, the detecting device determines that the first condition of a packet end signal is satisfied. When z1(i) is greater than the threshold within the sample index of time_range, the detecting device determines that the point of the corresponding sample index is to be considered an end of the packet. Details of an example operation of the aforementioned detecting are illustrated further in FIG. 10.

Figure 10:
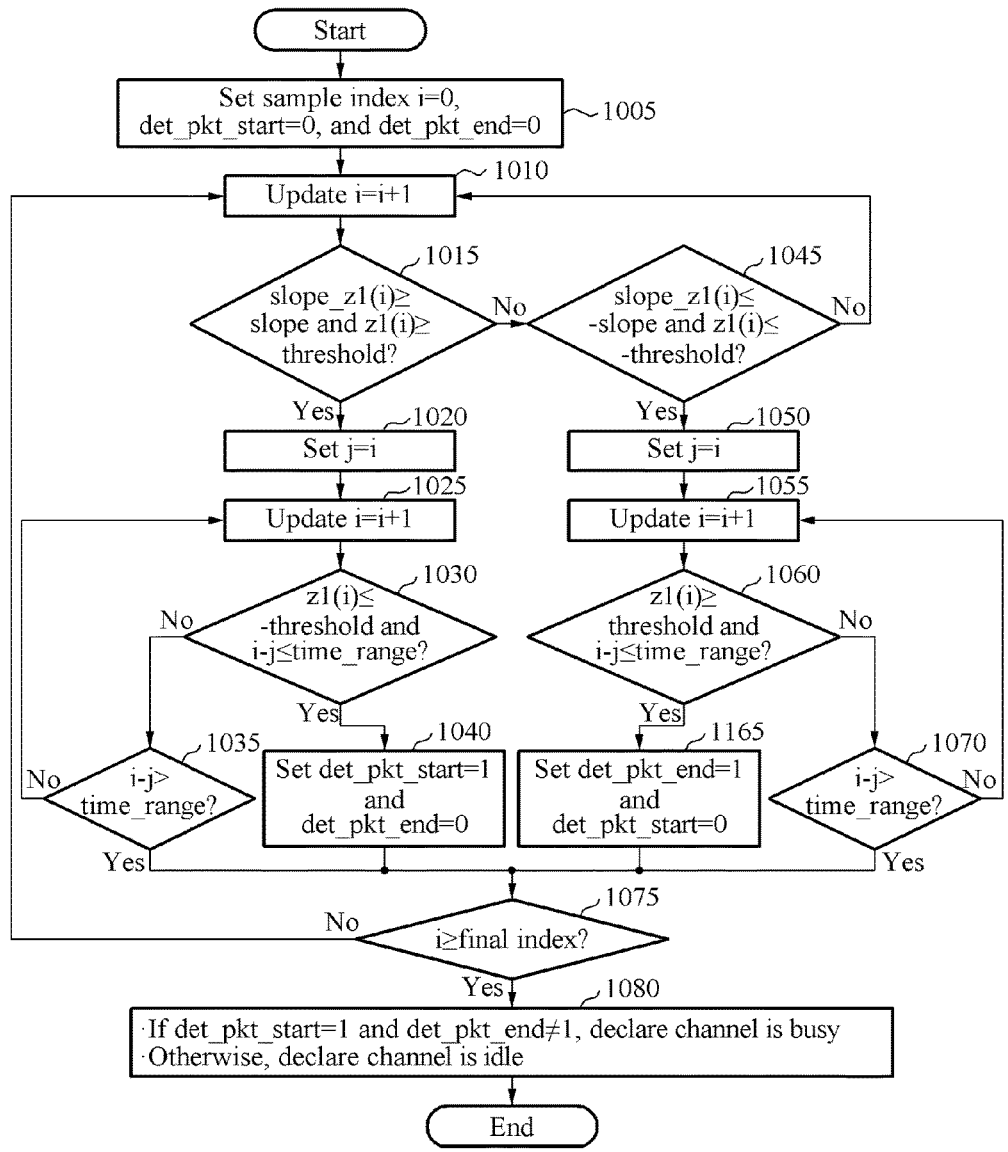
FIG. 10 is a flowchart illustrating an example of detecting, based on a threshold and a slope, an interference signal by a first detector of a device for detecting interference according to one or more example embodiments.

FIG. 10 is a flowchart illustrating an example of detecting, based on a threshold and a slope, an interference signal performed by a first detector of a device designed for detecting interference according to one or more example embodiments.

Referring to the example of FIG. 10, the method is performed by a detecting device. Aspects of such a detected device are discussed further above and redundant aspects are not repeated, for brevity, again noting that embodiments are not limited thereto. For example, the method, as performed by a detecting device, may detect interference by setting, as a detection parameter, a predetermined threshold of an output magnitude of a low pass filter (LPF) and a slope indicating a predetermined slope value on a time axis of the output of the LPF.

As illustrated in the example of FIG. 10, a signed LPF may be used without using an unsigned LPF.

The method generates an output z1(i) of the signed LPF through an analog-digital converter (ADC) output that is to be received, and then sets a value of a sample index i, a start point det_pkt_start of an interference detection packet, and an end point det_pkt_end of the interference detection packet to be 0 in operation 1005.

The method increases the value of the sample index i by 1 in operation 1010, and then determines whether slope_z1

(i) corresponding to the slope of the current time axis of z1(i) is greater than or equal to a slope and z1(i) is greater than or equal to the threshold in operation 1015.

Based on a result of the determining that z1(i) is greater than or equal to the threshold and slope_z1(i) is greater than or equal to the slope in operation 1015, the method determines that a corresponding signal satisfies a first condition for being a start point of the interference detection packet, for example, a predetermined detection window of a received signal. Thus, the method sets a value of a corresponding sample index as a value of a sample index j in operation 1020 and then increases the value of the sample index by 1 in operation 1025.

Subsequent to operation 1025, the method determines whether z1(i) is less than or equal to the value −threshold within a predetermined sample index, for example, in a range of sample i−j≤time_range within time_range in operation 1030.

When the foregoing condition is not satisfied in operation 1030, the method determines whether the predetermined sample index i−j is greater than or equal to time_range in operation 1035.

Based on a result of the determining that the value of predetermined sample index i−j is greater than time_range in operation 1035, the method determines whether a corresponding sample index i is a final index in operation 1075. Based on a result of the determining that the predetermined sample index i−j is less than or equal to time_range in operation 1035, the method increases the value of the sample index by 1 in operation 1025.

When z1(i) is less than or equal to −threshold and the sample i−j≤time_range is within time_range in operation 1030, the method determines the start of the interference detection packet and sets the start point det_pkt_start of the interference detection packet to be 1 and the end point det_pkt_end of the interference detection packet to be 0 in operation 1040.

When the value of slope_z1(i) is less than slope and z1(i) is less than the threshold in operation 1015, the method determines whether slope_z1(i) is less than or equal to −slope and z1(i) is less than or equal to the value of −threshold in operation 1045.

Based on the result of the determining that slope_z1(i) is less than −slope and z1(i) is less than or equal to the value of −threshold in operation 1045, the method determines that a corresponding signal satisfies the predetermined detection window of the received signal, for example, a condition of being the end point of the interference detection packet. Thus, the method sets the value of the sample index i to be the value of the sample index j in operation 1050, and then increases the value of the sample index by 1 in operation 1055.

Subsequent to operation 1055, the method determines whether z1(i) is greater than or equal to the threshold within the range of the predetermined sample index, for example, in the sample i−j≤time_range within time_range in operation 1060.

Based on a result of the determining that z1(i) is greater than or equal to the threshold in the range of sample i−j≤time_range within time_range in operation 1060, the method determines that the corresponding signal is to be considered to be an end of the interference detection packet, and sets the indicator of the end point det_pkt_end of the interference detection packet to be 1, and the indicator of the start point det_pkt_start of the interference detection packet to be 0 in operation 1065.

When the foregoing condition is not satisfied in operation 1060, the method determines whether a value of a sample index i−j is greater than time_range in operation 1070.

Based on a result of the determining that the value of the sample index i−j is less than or equal to time_range in operation 1070, the method increases the value of the sample index by 1 in operation 1055. Based on a result of the determining that the value of the sample index i−j is greater than time_range, the method determines whether the corresponding sample index is the final index in operation 1075.

Based on a result of the determining that the corresponding sample index is not the final index in operation 1075, the method increases the sample index by 1 in operation 1010.

Based on the result of the determining being that the corresponding sample index is the final index in operation 1075, the method outputs an interference detection result in operation 1080. When the indicator of the start point det_pkt_start of the interference detection packet and the indicator of the end point det_pkt_start of the interference detection packet are set to be 1 in operation 1080, the method determines that a corresponding frequency channel is in a busy state, or otherwise, the method determines that the corresponding frequency channel is in an idle state.

Figure 11:
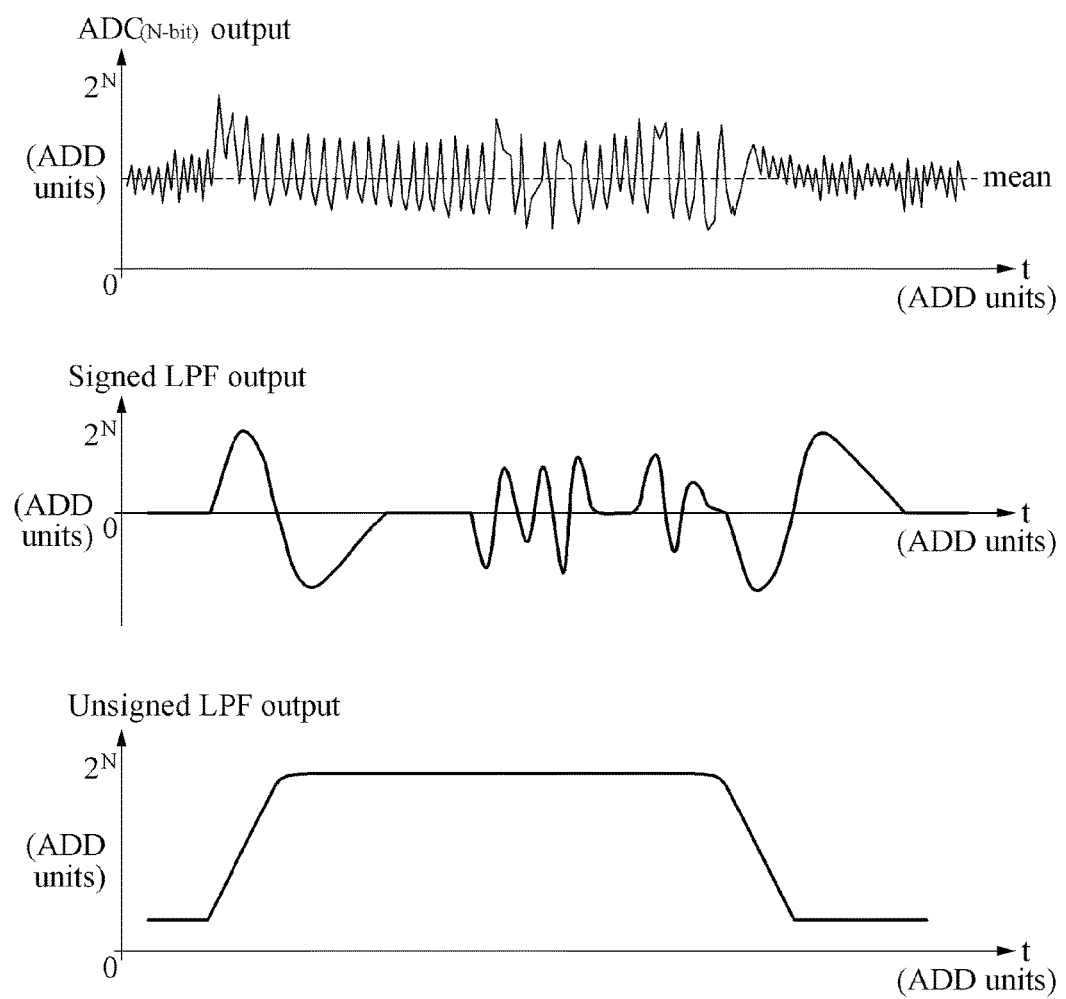
FIG. 11 is a graph illustrating outputs of filters and an analog-digital converter (ADC) output when a signal using a coherent modulation scheme is received according to one or more example embodiments.

FIG. 11 is a graph illustrating outputs of filters and an analog-digital converter (ADC) when a signal using a coherent modulation scheme is received according to one or more example embodiments.

FIG. 11 illustrates an example of a signal waveform of an example embodiment ADC output when a signal using a non-coherent modulation scheme is received and examples of signal waveforms of a signed low pass filter (LPF) and an unsigned LPF corresponding to such a signal.

Since the signal using the non-coherent modulation scheme has different values based on corresponding transmission bits of an output of an envelope detector, swing may be performed on an ADC output value based on an intermediate value during a time when a packet or a signal is received, unlike a signal using a coherent modulation scheme.

When the signal, for example, a packet, using the non-coherent modulation scheme is received, the signal waveform of the ADC output and the signal waveform of the corresponding unsigned LPF output are illustrated in FIG. 11.

Similar to what is illustrated in the example of FIG. 3, remaining noise components may be ignored in the outputs of the signed LPF and the unsigned LPF as illustrated in the example of FIG. 11.

Figure 12:
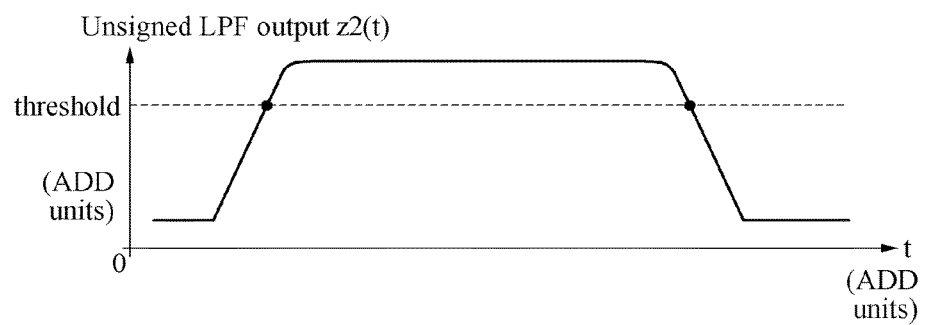
FIG. 12 is a graph illustrating an example of detecting, based on a threshold, an interference signal by a second detector of a device for detecting interference according to one or more example embodiments.
Figure 13:
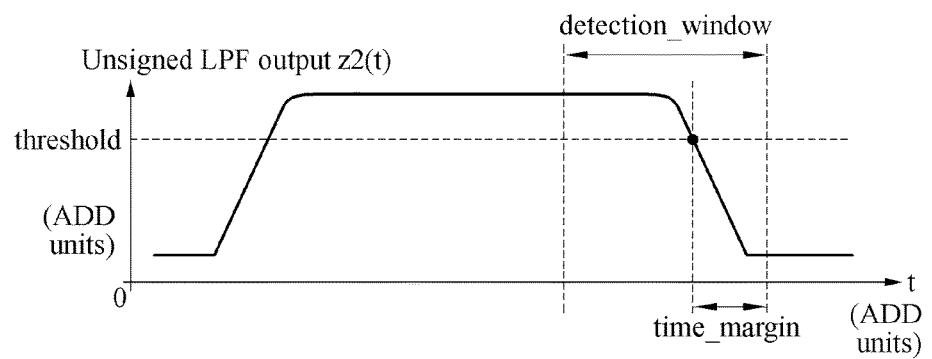
FIG. 13 is a graph illustrating an example of detecting, based on a threshold and a time margin, an interference signal by a second detector of a device for detecting interference according to one or more example embodiments.

Examples of detecting interference using a non-coherent modulation scheme to be applied to the signal waveforms in FIG. 11 are described further with reference to the examples of FIGS. 12 and 13.

FIG. 12 is a graph illustrating an example of detecting, based on a threshold, an interference signal by a second detector of a device for detecting interference according to one or more example embodiments. FIG. 13 is a graph illustrating an example of detecting, based on a threshold and a time margin, an interference signal by a second detector of a device for detecting interference according to one or more example embodiments.

FIG. 12 illustrates an example of detecting interference by setting, as a detection parameter, a predetermined threshold of an output magnitude of a low pass filter (LPF). FIG. 12 illustrates an example of signal processing when an unsigned LPF is used.

FIG. 13 illustrates an example of detecting interference by setting, as the detection parameter for detecting an interference signal, the predetermined threshold of the output magnitude of the LPF and time_margin. In the example of FIG. 13, the method operations may be performed by, for example, a detecting device as discussed above, though not limited thereto.

For example, a detecting device may generate an output z2(t) of the unsigned LPF through an analog-digital converter (ADC) output that is to be received and then initially determine that the interference exists when a value of z2(t) is greater than the predetermined threshold.

Even when a value of the output z2(t) greater than the threshold exists, the detecting device determines that the interference disappears when a final value of z2(t) of a detection window is less than the threshold and when a number of z2(t) samples is also less than the threshold and is also greater than or equal to time_margin. In such an embodiment, the z2(t) samples may be consecutively sampled until such detection terminates. Details of an operation of a detecting, such as the aforementioned detecting of the preceding figures, are illustrated in further detail in FIG. 14.

Figure 14:
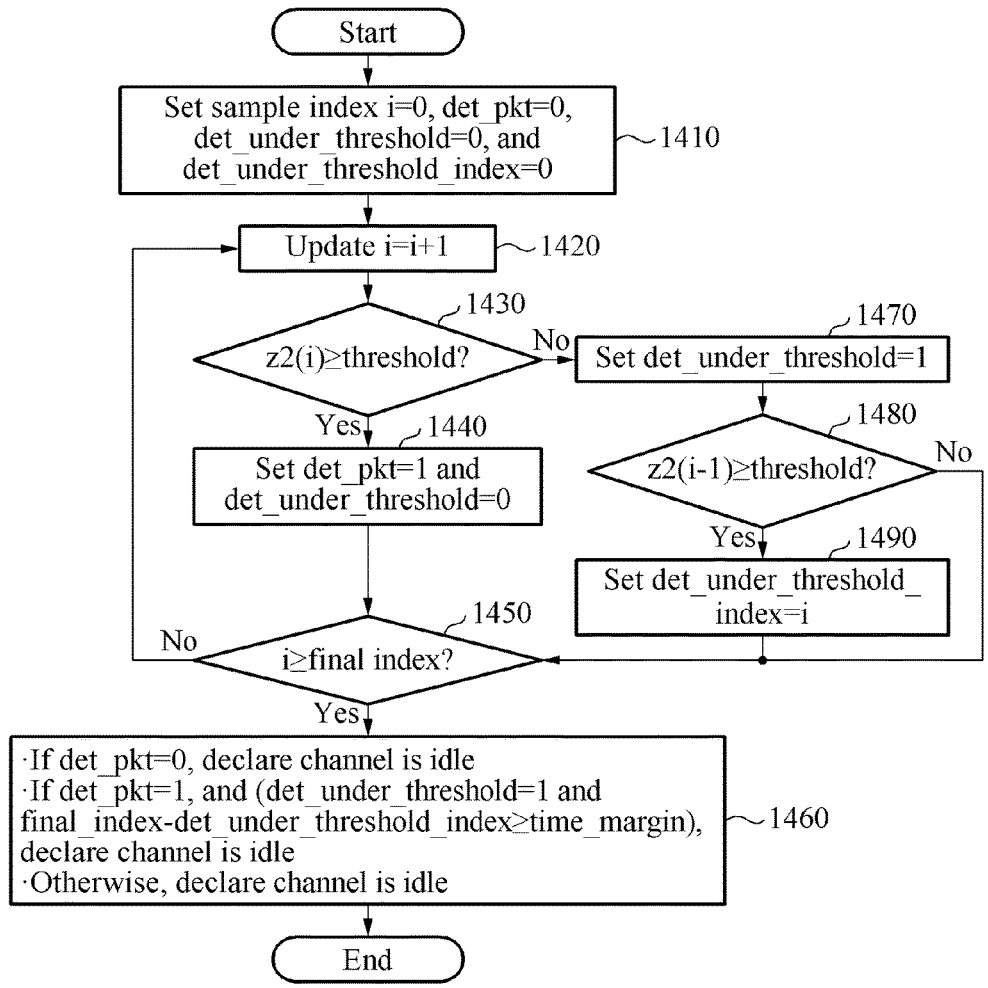
FIG. 14 is a flowchart illustrating a method of detecting interference by a second detector of a device for detecting an interference signal according to one or more example embodiments.

FIG. 14 is a flowchart illustrating a method of detecting interference by a second detector of a device for detecting an interference signal according to one or more example embodiments. For example, the method illustrated in FIG. 14 may be performed by a detecting device. Such detecting devices have been discussed further, above, and redundant discussion is omitted for brevity.

Referring to the example of FIG. 14, in operation 1410, a method generates an output z2(i) of an unsigned low pass filter (LPF) through an analog-digital converter (ADC) output that is to be received and then sets a value of each of a sample index i, det_pkt, det_under_threshold, and det_under_threshold_index to be 0. In this example, det_pkt is an indicator to indicate that an interference packet is detected, det_under_threshold is an indicator to indicate that an output value is less than a threshold, and det_under_threshold_index is an index on a time axis when an output value of an LPF is less than the threshold.

The method increases the value of the sample index i by 1 in operation 1420, and then determines whether z2(i) is greater than or equal to the threshold in operation 1430.

Based on a result of the determining that z2(i) is less than the threshold in operation 1430, the method sets det_under_threshold_index to be 1 in operation 1470 and determines whether z2(i−1) is greater than or equal to the threshold in operation 1480.

Based on the result of the determining that z2(i−1) is greater than or equal to the threshold in operation 1480, the method sets det_under_threshold_index to be i in operation 1490 and then determines whether the corresponding sample index i is greater than or equal to the final index in operation 1450.

Based on the result of the determining that z2(i) is greater than or equal to the threshold in operation 1430, the method initially determines that interference exists. In such an example, the method sets det_pkt to be 1, sets det_under_threshold to be 0 in operation 1440, and then determines whether the corresponding sample index i is greater than or equal to the final index in operation 1450.

When the corresponding sample index i is less than the final index in operation 1450, the method increases the sample index by 1 in operation 1420.

When the corresponding sample index i is greater than or equal to the final index in operation 1450, the method outputs an interference detection result in operation 1460.

In operation 1460, because det_pkt=0 indicates that the interference is not detected, the method determines that a corresponding frequency is in an idle state.

Even when a value of a waveform corresponding to one or more received signals is greater than a threshold and det_pkt=1 is satisfied, the method determines that the interference disappears when the condition det_under_threshold_index=1 is satisfied and the condition that final_index−det_under_threshold_index is greater than or equal to a time margin value of time_margin. Concisely put, when a final value of z2(t) of a detection window is less than the threshold and when a number of z2(t) samples is less than the threshold and is also greater than or equal to time_margin, the method determines that the interference disappears. In such an example, the z2(t) samples may be consecutively sampled until a detection process terminates, based on the approach discussed further above. In this example, the method determines that a corresponding frequency channel is in an idle state. Except for in a case as described in operation 1460, the method determines that the corresponding frequency channel is in a busy state.

Figure 15:
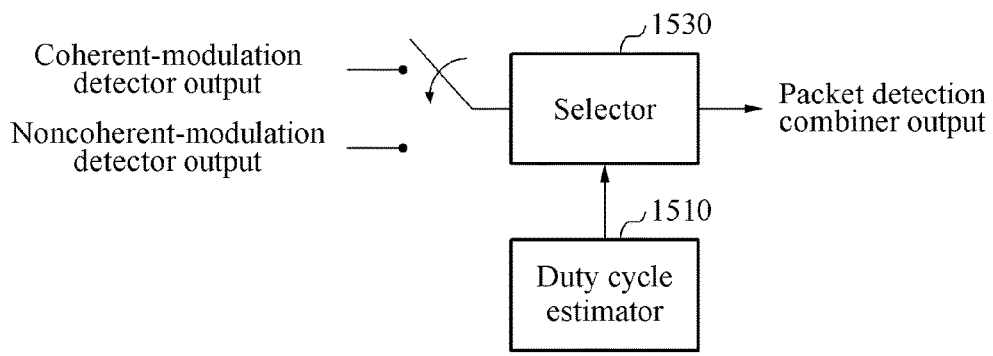
FIG. 15 is a block diagram illustrating a combiner of a device for detecting an interference signal according to one or more example embodiments.

FIG. 15 is a block diagram illustrating a combiner of a device for detecting an interference signal according to one or more example embodiments.

FIG. 15 illustrates an example in which the combiner uses a statistical distribution characteristic of received signals as a preset condition.

The combiner includes a duty cycle estimator 1510 and a selector 1530.

The duty cycle estimator 1510 estimates a duty cycle that is an example of the statistical distribution characteristic of the received signals and accordingly transmits a result of the estimating to the selector 1530.

Additionally, the selector 1530 determines that an interference signal exists by switching any one of an output of a first detector and an output of a second detector based on the result of the estimating.

Figure 16:
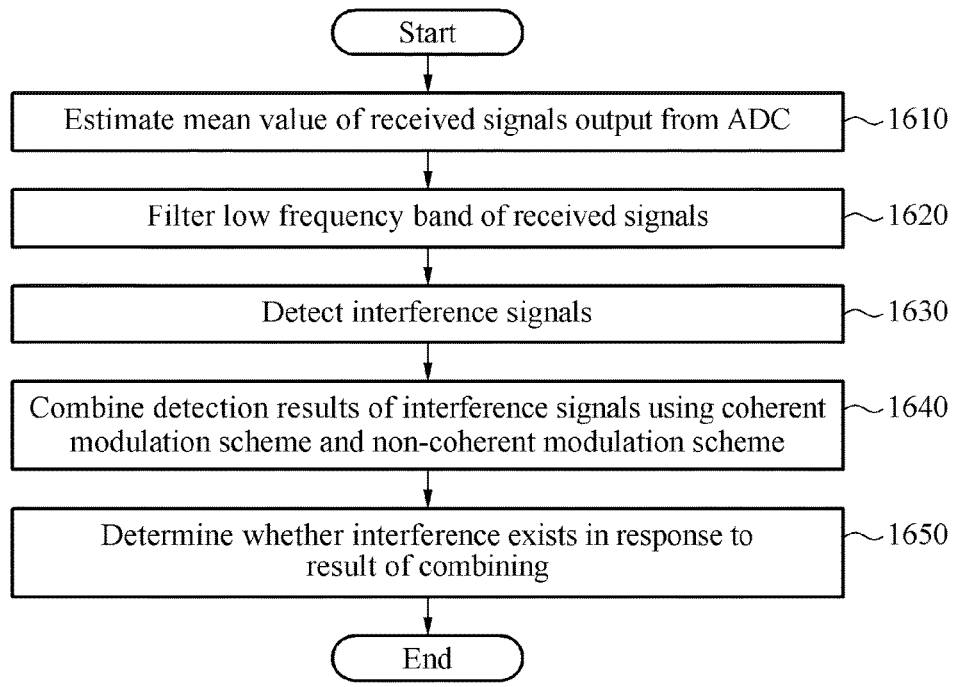
FIG. 16 is a flowchart illustrating a method of detecting an interference signal according to one or more example embodiments.

FIG. 16 is a flowchart illustrating a method of detecting an interference signal according to one or more example embodiments. For example, such a method may be performed by a detecting device, such as discussed further, above, noting embodiments are not limited thereto.

Referring to the embodiment of FIG. 16, a method estimates a mean value of received signals output from an analog-digital converter (ADC) in operation 1610. Here, the ADC may be an ADC included in a receiver having a structure of being an envelope detector.

In operation 1620, the method filters a low frequency band of the received signals using the estimated mean value.

In operation 1630, the method detects interference signals using a coherent modulation scheme and a non-coherent modulation scheme from the received signals filtered in operation 1620. In operation 1630, the method detects a first interference signal using the coherent modulation scheme and a second interference signal using the non-coherent modulation scheme.

Thus, the detecting device may detect the first interference signal based on received signal characteristics, for example, characteristics of signal waveforms having opposite directions, of signal waveforms occurring at a start point and an end point of a predetermined detection window of the received signals.

A method of detecting the first interference signal is described in further detail below.

The method adjusts, for example, selects or combines, a detection parameter for detecting the first interference signal and detects the characteristic of the start point of the predetermined detection window based on the adjusted detection parameter. The method detects the characteristic of the signal waveform of the end point of the predetermined detection window based on the detection parameter and then determines whether the first interference signal exists based on the characteristic of the signal waveform at the start point and the characteristic of the signal waveform at the end point.

In operation 1640, the method combines results of the interference signal detecting using the coherent modulation scheme and the non-coherent modulation scheme or performs switching on the detection results based on a preset condition. The combining produces results that are used when determining whether interference exists in frequency channels.

In operation 1650, the method determines whether interference exists in a current frequency channel in response to a result of the combining that occurred in operation 1640.

According to an embodiment, a method may detect an outside interference signal using both of a non-coherent modulation scheme which is a similar type of a scheme used by an envelope detector and an outside interference signal using a coherent modulation scheme which is a different type of the scheme used by the envelope detector, from a low-power receiver having a structure of the envelope detector. According to such an embodiment, a method enhances communication reliability of a low-power transmitter and a low-power receiver by simultaneously detecting all interference components regardless of whether an interference source uses a coherent modulation scheme or a non-coherent modulation scheme and combining detection results. As a result, the advantages provided by each type of modulation scheme are available. In addition, the method may reduce an amount of power consumption by preventing re-transmission of a packet or a signal occurring due to conflict with an outside interference signal.

The apparatuses, units, modules, devices, and other components illustrated in FIGS. 1-16 that perform the operations described herein with respect to FIGS. 1-16 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. As noted, in one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-16. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-16 that perform the operations described herein with respect to FIGS. 1-16 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device for detecting an interference signal, comprising:
   an estimator configured to estimate a mean value of received signals output from an analog-digital converter (ADC);
   a filter configured to filter a low frequency band of the received signals using the estimated mean value to produce filtered received signals, wherein
   the filter comprises:
      a signed low pass filter (LPF) having a positive signal component and a negative signal component as an output; and
      an unsigned LPF having the positive signal component as the output, and
   the filter is configured to filter the low frequency band of the received signals selectively or simultaneously using the signed LPF and the unsigned LPF;
   a detector configured to detect, respectively from the filtered received signals, a first interference signal using a coherent modulation scheme and a second interference signal using a non-coherent modulation scheme; and
   a combiner configured to combine, based on a preset combining condition, information of the first interference signal detected using the coherent modulation scheme and information of the second interference signal detected using the non-coherent modulation scheme, and to determine whether interference exists in a frequency channel in response to a result of the combining.

2. The device of claim 1, wherein the detector comprises:
   a first detector configured to detect the first interference signal using the coherent modulation scheme; and
   a second detector configured to detect the second interference signal using the non-coherent modulation scheme.

3. The device of claim 1, wherein, for the combining of the information, the combiner is further configured to combine, based on the preset combining condition, the first interference signal detected using the coherent modulation scheme and the second interference signal detected using the non-coherent modulation scheme.

4. The device of claim 2, wherein the detector is configured to detect the first interference signal and the second interference signal selectively or simultaneously using the first detector and the second detector.

5. The device of claim 2, wherein the first detector is configured to detect the first interference signal based on characteristics of signal waveforms occurring at a start point and an end point of a predetermined detection window of the received signals.

6. The device of claim 2, wherein when the preset combining condition is a first combining condition based on a result obtained by performing an AND operation with respect to a detection result of the first detector and a detection result of the second detector, the combiner is configured to determine that the interference signals exist in response to the interference signals being detected by the first detector and the second detector.

7. The device of claim 2, wherein when the preset combining condition is a second combining condition, based on a result obtained by performing an OR operation with respect to a detection result of the first detector and a detection result of the second detector, the combiner is configured to determine that the interference signals exist in response to the interference signals being detected by at least one of the first detector or the second detector.

8. The device of claim 2, wherein when the preset combining condition is a third combining condition, based on a detection result of at least one of the first detector or the second detector chosen based on a statistical distribution characteristic of the received signals, the combiner is configured to determine that the interference signals exist based on the detection result of at least one of the first detector or the second detector.

9. The device of claim 2, wherein the second detector comprises:
   a detection parameter setter configured to set a detection parameter for detecting the second interference signal from a predetermined detection window of the received signals; and
   a second determiner configured to determine whether the second interference signal exists based on the detection parameter.

10. The device of claim 1, further comprising:
    a channel switch configured to switch an operation frequency channel from the frequency channel to another frequency channel based on whether the interference is determined to exist.

11. The device of claim 5, wherein the first detector comprises:
    a detection parameter adjuster configured to adjust a detection parameter used for detecting the first interference signal;
    a start signal detector configured to detect the characteristic of the signal waveform at the start point of the predetermined detection window based on the detection parameter;
    an end signal detector configured to detect the characteristic of the signal waveform at the end point of the predetermined detection window based on the detection parameter; and
    a first determiner configured to determine whether the first interference signal exists based on the characteristic of the signal waveform occurring at the start point and the characteristic of the signal waveform occurring at the end point.

12. The device of claim 8, wherein the combiner further comprises:
    a duty cycle estimator configured to estimate the statistical distribution characteristic of the received signals; and a selector configured to determine that the interference signals exist by switching to select the output of the first detector or the output of the second detector based on a result of the estimating.

13. The device of claim 9, wherein the detection parameter comprises at least one of a threshold of an output magnitude of an LPF or a time margin.

14. The device of claim 10, wherein the channel switch is configured to adjust a frequency response characteristic parameter of a filter having an output signal of an envelope detector as an input signal in response to the operation frequency channel being switched.

15. The device of claim 10, further comprising:
a channel selector configured to select another frequency channel as the operation frequency channel in response to a determination result of whether the interference exists in the switched another frequency channel.

16. The device of claim 11, wherein the detection parameter comprises at least one of a threshold of an output magnitude of an LPF, a slope indicating a predetermined slope value on a time axis of an output of the LPF, or a time range.

17. A method of detecting an interference signal, comprising:
estimating a mean value of received signals output from an analog-digital converter (ADC);
filtering a low frequency band of the received signals using the estimated mean value to produce filtered received signals;
detecting, respectively from the filtered received signals, a first interference signal using a coherent modulation scheme and a second interference signal using a non-coherent modulation scheme, wherein the detecting of the first interference signal comprises detecting the first interference signal based on characteristics of signal waveforms at a start point and an end point of a predetermined detection window of the received signals;
combining, based on a preset combining condition, information of the first interference signal detected using the coherent modulation scheme and information of the second interference signal detected using the non-coherent modulation scheme; and
determining whether interference exists in a frequency channel in response to a result of the combining.

18. The method of claim 17, wherein the detecting comprises detecting the first interference signal and the second interference signal selectively or simultaneously using the coherent modulation scheme and the non-coherent modulation scheme.

19. The method of claim 17, wherein the detecting of the first interference signal comprises:
adjusting a detection parameter used for detecting the first interference signal;
detecting a characteristic of a signal waveform at a start point of a predetermined detection window based on the detection parameter;
detecting a characteristic of a signal waveform at an end point of the predetermined detection window based on the detection parameter; and
determining whether the first interference signal exists based on the characteristic of the signal waveform occurring at the start point and the characteristic of the waveform occurring at the end point.

20. A computer program embodied on a non-transitory computer readable medium, the computer program being configured to control a processor to perform the method of claim 17.

21. The method of claim 17, wherein the combining of the information further comprises combining, based on the preset combining condition, the first interference signal detected using the coherent modulation scheme and the second inference signal detected using the non-coherent modulation scheme.

22. The method of claim 19, wherein the detection parameter comprises at least one of a threshold of an output magnitude of an LPF, a slope indicating a predetermined slope value on a time axis of an output of the LPF, or a time range.

* * * * *